(12) United States Patent
Kiesewetter et al.

(10) Patent No.: US 7,128,365 B2
(45) Date of Patent: Oct. 31, 2006

(54) MOTOR VEHICLE BODY PART

(75) Inventors: Frank Kiesewetter, Germering (DE); Kerim Oezkoek, Unterschleissheim (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/639,777

(22) Filed: Aug. 13, 2003

(65) Prior Publication Data

US 2004/0104600 A1    Jun. 3, 2004

(30) Foreign Application Priority Data

Aug. 13, 2002  (DE)  ................ 102 37 090

(51) Int. Cl.
  *B62D 25/06*  (2006.01)
  *B60R 13/02*  (2006.01)
(52) U.S. Cl. ............ 296/191; 296/210; 296/214; 296/39.1
(58) Field of Classification Search ........ 296/191, 296/210, 214, 146.7, 211, 39.1
  See application file for complete search history.

(56) References Cited

U.S. PATENT DOCUMENTS

| | | | | |
|---|---|---|---|---|
| 3,583,754 A * | 6/1971 | Von Berckheim | ............ | 296/214 |
| 3,867,240 A * | 2/1975 | Doerfling | ............ | 428/71 |
| 3,934,066 A * | 1/1976 | Murch | ............ | 442/221 |
| 4,119,749 A * | 10/1978 | Roth et al. | ............ | 428/99 |
| 4,150,186 A * | 4/1979 | Kazama | ............ | 428/140 |
| 4,310,587 A * | 1/1982 | Beaupre | ............ | 442/31 |
| 4,469,731 A * | 9/1984 | Saracino | ............ | 428/68 |
| 4,475,765 A | 10/1984 | Vogt et al. | | |
| 4,886,696 A * | 12/1989 | Bainbridge | ............ | 428/184 |
| 4,933,225 A * | 6/1990 | Abe | ............ | 428/157 |
| 5,082,716 A * | 1/1992 | Satterfield et al. | ............ | 428/175 |
| 5,089,328 A * | 2/1992 | Doerer et al. | ............ | 428/308.4 |
| 5,137,764 A * | 8/1992 | Doyle et al. | ............ | 428/44 |
| 5,218,792 A * | 6/1993 | Cooper | ............ | 52/46 |
| 5,383,815 A * | 1/1995 | Kiesel et al. | ............ | 454/137 |
| 5,385,774 A * | 1/1995 | Cramer et al. | ............ | 442/229 |
| 5,456,513 A * | 10/1995 | Schmidt | ............ | 296/39.1 |
| 5,503,903 A * | 4/1996 | Bainbridge et al. | ............ | 428/182 |
| 5,766,395 A * | 6/1998 | Bainbridge et al. | ............ | 156/222 |
| 5,845,458 A * | 12/1998 | Patel | ............ | 52/782.1 |
| 6,099,680 A * | 8/2000 | Harris et al. | ............ | 156/279 |
| 6,276,748 B1 * | 8/2001 | Gobessi et al. | ............ | 296/190.02 |
| 6,355,317 B1 * | 3/2002 | Reid et al. | ............ | 428/34 |
| 6,375,249 B1 * | 4/2002 | Stanton et al. | ............ | 296/178 |
| 6,499,797 B1 * | 12/2002 | Bohm et al. | ............ | 296/191 |
| 6,524,712 B1 * | 2/2003 | Schledjewski et al. | ... | 428/423.1 |
| 6,626,622 B1 * | 9/2003 | Zubko | ............ | 410/113 |
| 6,655,730 B1 * | 12/2003 | Yamagata et al. | ............ | 296/214 |
| 6,673,415 B1 * | 1/2004 | Yamazaki et al. | ............ | 428/117 |

FOREIGN PATENT DOCUMENTS

| | | |
|---|---|---|
| DE | 43 28 716 A1 | 3/1994 |
| DE | 196 32 055 C1 | 11/1997 |
| DE | 100 19 201 A1 | 10/2001 |
| EP | 0 994 008 A2 | 4/2000 |
| GB | 730127 | 5/1955 |
| GB | 1490575 | 11/1977 |

\* cited by examiner

*Primary Examiner*—D. Glenn Dayoan
*Assistant Examiner*—Gregory A. Blankenship
(74) *Attorney, Agent, or Firm*—David S. Safran

(57) ABSTRACT

A motor vehicle body part, especially a motor vehicle roof, cargo bed, or the like, which includes a composite material having an outside skin and a support structure in a sandwich structure. In order to prevent a penetration of moisture into the support structure, the support structure, at least in certain areas, is provided with a vapor barrier layer.

15 Claims, 2 Drawing Sheets

MOTOR VEHICLE BODY PART

BACKGROUND OF THE INVENTION

1. Field of the Invention

The invention relates to a motor vehicle body part, especially a motor vehicle roof, a cargo bed or the like.

2. Description of Related Art

A prefabricated roof module as a motor vehicle body part is disclosed in published German Patent Application DE 100 19 201 A1. This roof module is of a sandwich construction in layers from an outside shell which represents the outside skin and an inside shell which constitutes the support structure. The two shells are formed on a foam core base. The side of the foam core of the outside shell facing the environment is covered by a sheet metal, e.g., plastic or aluminum layer, and the side of the foam core of the inside sheet facing the vehicle interior is covered by a soft plastic material. Furthermore, the roof module includes a removable protective film which serves as protection of the roof module during painting the pertinent motor vehicle and is removed after painting.

Additionally, a roof module with a plastic outside skin and a support structure has been produced in a sandwich construction which includes a paper honeycomb core. This type of roof module encounters the problem that the paper honeycomb can absorb moisture over time which reduces the stiffness of the roof module.

SUMMARY OF THE INVENTION

A primary object of the present invention is to provide a motor vehicle body part of the type described in which the danger of absorption of moisture by the support structure is minimized.

The object of the invention is achieved by placing on the support structure of the body part a layer which effectively prevents penetration of moisture or water vapor from the atmosphere into the support structure. In particular, when the support structure is a sandwich construction having a paper honeycomb core material, any moisture-induced weakening of the stiffness of the body part can be counteracted by the present invention since the absorption of moisture by the paper honeycomb is essentially precluded.

The motor vehicle body part of the invention is particularly suited for all outside and inside plate-shaped structures of motor vehicle bodies which are made as a composite component. The motor vehicle body part can be designed such that the support structure, on the surfaces through which moisture could penetrate, is provided with a vapor barrier layer.

If the body part of the invention is made as an outside part of a body, the body part can include an outside skin composed of a plastic film, an aluminum or steel layer. One suitable plastic film is produced for example from ABS, ASA, ASA-PC or PC and can be made as a deep-drawn preform. When this outside skin covers the support structure on only one side, the vapor barrier layer is feasibly located only on the side of the support structure facing away from the outside skin.

When the body part is made as a prefabricated or premounted roof module, the dimensions correspond essentially to those of a body roof frame in which roof module can be inserted or cemented on the peripheral edge area via a cement bead. Furthermore, the roof module can be provided with conventional equipment, such as a sliding roof, an inside head liner, handles, lights and the like.

The body part can also be made as a movable surface, for example, as a sliding roof, as the louver of a louvered sliding roof or also as a sliding head liner.

When the body part of the invention is a plate-like structure located within the vehicle, such as a cargo bed, a shelf or the like, the outside skin can be formed from a material laminate or of hard rubber. The outside skin can then encompass the support structure made as a sandwich structure on one side or even on several sides. The vapor barrier layer in this embodiment can be located on one or more sides of the support structure or can also completely surround the support structure so that it is located at least in areas between the support structure and the outside skin. For example, the support structure is jacketed completely by the vapor barrier layer which in turn is provided with a material lamination.

The support structure of the body part of the invention is constructed as a sandwich structure is preferably produced with a honeycomb structure, particularly a honeycomb structure of paper or cardboard. Thus, the sandwich structure can include a paper honeycomb which is optionally positioned between two glass fiber mats and which is covered on both sides with a layer of polyurethane. Each polyurethane layer can include a reinforcement of glass fibers.

According to one preferred embodiment of the motor vehicle body part of the invention, the vapor barrier layer is a vapor-blocking film. In this embodiment, it is possible to choose a film with a coefficient of temperature expansion which counteracts the deformation of the body part which is equivalent to the bimetal effect as a result of the different coefficients of temperature expansion of the outside skin and the support structure.

The vapor-blocking film in a particularly preferred embodiment of the motor vehicle body part of the invention is a composite film which ensures secure adhesion of the film to the support structure. For example, the composite film is a four-layer composite film which comprises a highly transparent polyester film and an inflammable polyethylene film. A corrosion-proof aluminum layer can be embedded between these films. Essentially any plastic composite film with good vapor barrier properties, especially with regard to an outside film layer, can be used. Of course, a single-layer film with sufficient vapor barrier properties can also be used.

The composite film can also be an aluminum composite film, for example a composite film in which an aluminum foil is coated with polyethylene film or foam. For reinforcement a gauze fabric is placed between the aluminum foil and the polyethylene foam.

Alternatively, the vapor-blocking film can also be a highly elastic polyurethane film composed of a thermoplastic polyurethane. The polyurethane film can be transparent. For example, polypropylene can also be used as the material for the vapor-blocking film.

The vapor blocking plastic film and/or metal foil preferably has a thickness between 0.25 and 1 mm, but is not limited to this thickness.

The film can be made self-adhesive or can be applied to the support structure by means of a cement.

In the manufacture of the motor vehicle body part of the invention, the vapor-blocking film can be integrated into a production process which takes place in a suitable molding tool for the material composite of outside skin and support structure. The vapor-blocking film can be applied, for example cemented, to the inside of the support structure in the design of a body part as a roof module, but also after production of the material composite of the outside skin and support structure.

In one alternative embodiment of the motor vehicle body part of the invention, the vapor barrier layer is formed from a liquid vapor barrier. When the body part is designed as a roof module, such a coating of the inside of the support structure which is produced for example from an impregnation liquid, can be mechanically or manually sprayed on or painted on after producing the material composite of the outside skin and support structure.

Other advantages and advantageous embodiments of the subject matter according to the invention will become apparent from the specification, the drawings and the claims.

Two embodiments of a motor vehicle body part of the invention are shown schematically simplified in the drawings.

DETAILED DESCRIPTION OF THE INVENTION

Figure 1:
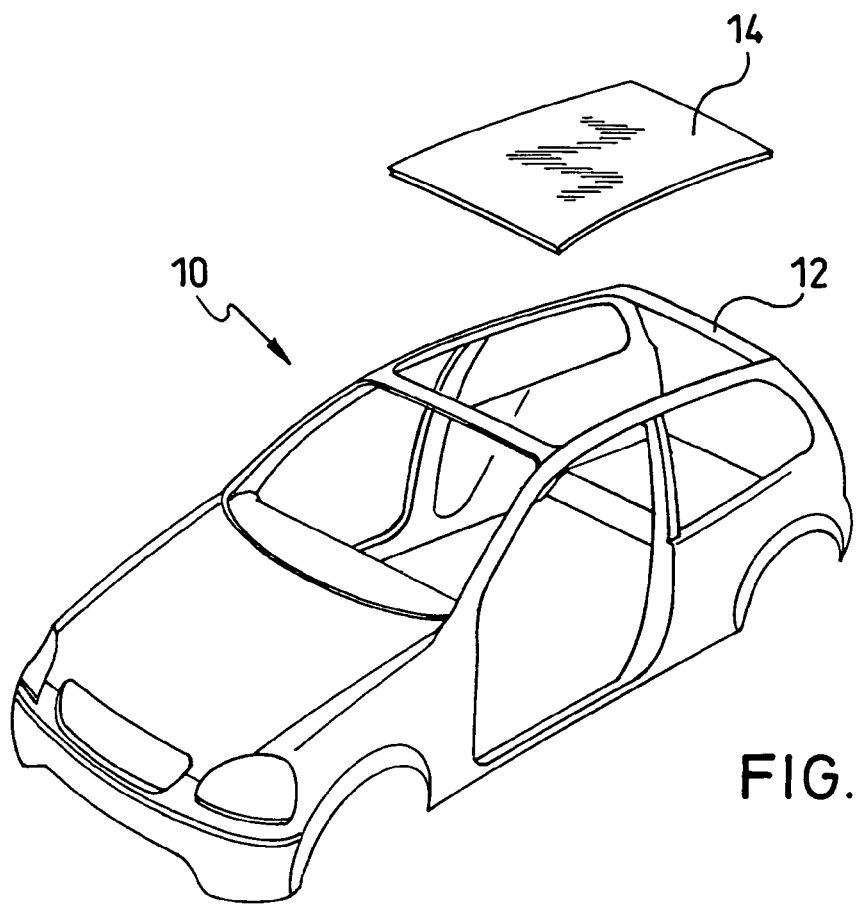
FIG. 1 shows a partial view of a passenger car with a roof module.

FIG. 1 shows a passenger car motor vehicle 10 which has a roof frame 12 into which a pre-mounted roof module 14 of the invention covers the motor vehicle interior. The connection between the roof module 14 and the roof frame 12 is made via a peripheral cement bead which is not detailed here.

Figure 2:
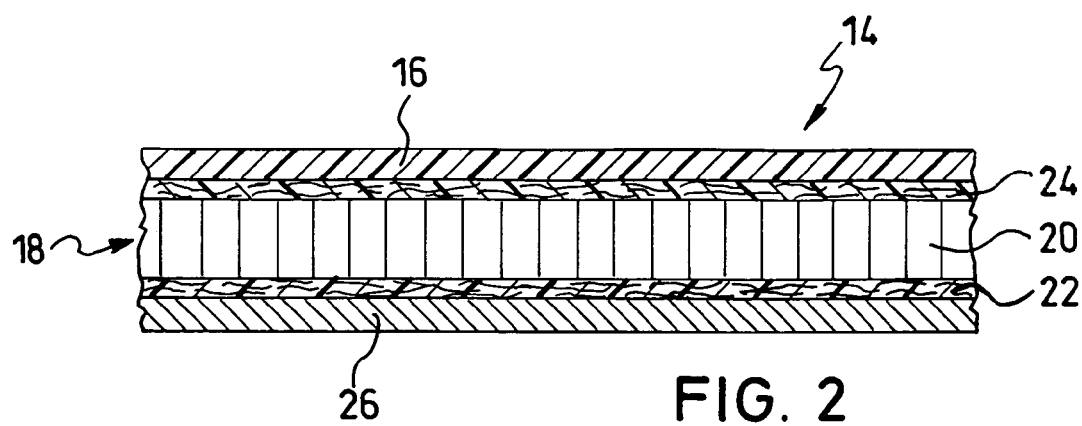
FIG. 2 shows a section through the roof module.

FIG. 2 shows a section, not to scale, through the roof module 14 illustrated in FIG. 1 which is composed of several layers and is fabricated before insertion into the roof frame 12. The roof module 14 comprises a plastic, for example, ASA-PC, as an outside skin 16 which has a thickness between 0.2 m and 2.0 mm and which has been fabricated as a deep drawn part. The outside skin 16 forms the surface of the roof module 14 which is outside relative to the vehicle interior, i.e., the roof surface of the motor vehicle 10.

The outside skin 16 is located with its side facing the motor vehicle interior, i.e. with its bottom or inside, on a support structure 18 which is made as a sandwich construction and comprises a paper honeycomb 20 which is located between two layers 22, 24 of a polyurethane/glass fiber mixture. The support structure 18 has a total thickness of approximately 10 mm.

On the bottom of the support structure 18 there is a vapor barrier layer 26 composed of a four-layer composite film of a highly transparent polyester film and an inflammable polyethylene film which can have an embedded corrosion-proof aluminum layer. The vapor barrier layer 26 has a thickness of approximately 0.25 to 1 mm.

Alternatively, the vapor barrier layer 18 includes, for example, a transparent polyurethane film or an aluminum composite film. The vapor barrier layer, however, can also be formed from an impregnation liquid which has been applied to the support structure.

The vapor barrier layer 26 leads to an improvement of the weather and climate resistance of the roof module 14, since absorption of water vapor or moisture from the atmosphere is essentially precluded.

Figure 3:
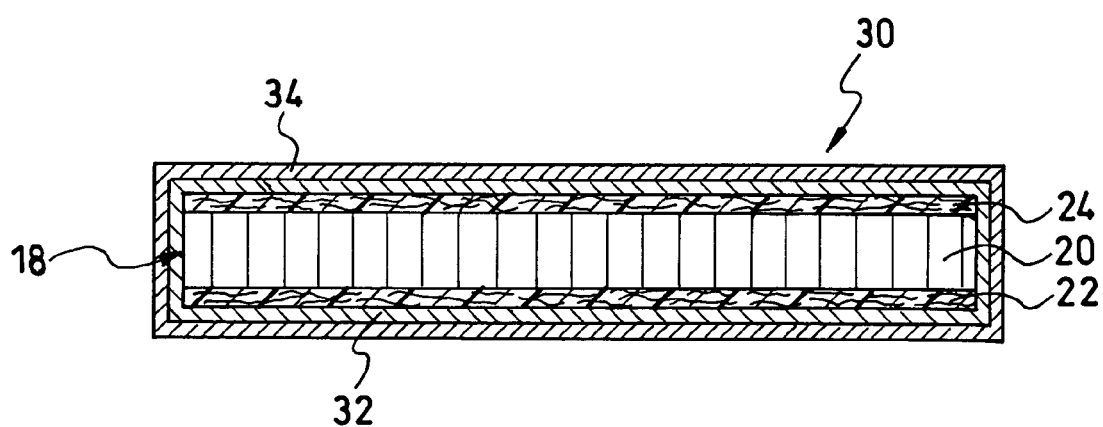
FIG. 3 shows a section through a cargo bed of a motor vehicle.

FIG. 3 shows a body part 30 which functions as a cargo bed located in the cargo space of a motor vehicle.

The body part 30 comprises a support structure 18 which is a sandwich structure and which includes a paper honeycomb 20 embedded between the polyurethane/glass fiber layers 22, 24.

The support structure 18 is surrounded completely by a vapor barrier layer 32 which is formed from an aluminum composite film. The vapor barrier layer 32 is in turn completely covered by an outside skin 34 constituted by a material lamination.

What is claimed is:

1. Motor vehicle body part able to function at least as a motor vehicle roof or a cargo bed comprising:
a material composite including a sandwich structure having an outside skin and a support structure,
wherein the support structure is a sandwich construction comprising a honeycomb sandwiched between two layers of a material containing polyurethane,
wherein at least some portions of the support structure are provided with a vapor barrier layer; and
wherein the vapor barrier layer encases the support structure and the outside skin is formed on the vapor barrier layer.

2. Motor vehicle body part as claimed in claim 1, wherein the vapor barrier layer is a vapor-blocking film.

3. Motor vehicle body part as claimed in claim 2, wherein the vapor barrier layer is a composite film.

4. Motor vehicle body part as claimed in claim 2, wherein the vapor-blocking film is formed from a thermoplastic polyurethane.

5. Motor vehicle body part as claimed in claim 2, wherein the vapor-blocking film is a self-adhesive film.

6. Motor vehicle body part as claimed in claim 1., wherein the vapor barrier layer is formed from a liquid vapor barrier.

7. Motor vehicle body part as claimed in claim 1, wherein the vapor barrier layer has a thickness between 0.25 and 1 mm.

8. Motor vehicle body part as claimed in claim 1, wherein the vapor barrier layer is applied to a surface of the support structure which is opposite a surface of the support structure supporting the outside skin.

9. Motor vehicle body part able to function at least as a motor vehicle roof or a cargo bed comprising:
a material composite including a sandwich structure having an outside skin and a support structure,
wherein the vapor barrier layer encases the support structure and the outside skin is formed on the vapor barrier layer, and
wherein the support structure is a sandwich construction comprising a material capable of absorbing moisture sandwiched between two layers of a polyurethane/glass fiber mixture.

10. Motor vehicle body part as claimed in claim 9, wherein the vapor baffler layer is a four-layer composite film composed of layers of a highly transparent film and an inflammable film.

11. Motor vehicle body pad as claimed in claim 10, wherein the four-layer composite film further includes an embedded corrosion-proof aluminum layer.

12. Motor vehicle body part as claimed in claim 10, wherein the highly transparent film is composed of a polyester and the inflammable film is composed of a polyethylene.

13. Motor vehicle body part as claimed in claim 9, wherein the material capable of absorbing moisture is honeycomb.

14. Motor vehicle body part able to function at least as a motor vehicle roof or a cargo bed comprising:

a material composite including a sandwich structure having an outside skin and a support structure, wherein at least some portions of the support structure are provided with a vapor barrier layer, wherein the vapor barrier layer encases the support structure and the outside skin is formed on the vapor barrier layer; and wherein the vapor barrier layer is selected from a transparent polyurethane film or an aluminum composite film.

15. Motor vehicle body part able to function at least as a motor vehicle roof or a cargo bed comprising:

a material composite including a sandwich structure having an outside skin and a support structure, wherein the support structure is a sandwich construction comprising a material capable of absorbing moisture sandwiched between two layers of a material containing polyurethane, and wherein at least some portions of the support structure are provided with a vapor barrier layer;

wherein the vapor barrier layer encases the support structure and the outside skin is formed on the vapor barrier layer.

* * * * *